(12) United States Patent
Chang et al.

(10) Patent No.: US 6,663,817 B1
(45) Date of Patent: Dec. 16, 2003

(54) METHOD FOR MANUFACTURE OF SLIDERS

(75) Inventors: Yu-En Percy Chang, Mountain View, CA (US); Yuri Igor Markevitch, San Jose, CA (US); Scott Thomas, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 430 days.

(21) Appl. No.: 09/277,862

(22) Filed: Mar. 26, 1999

(51) Int. Cl.$^7$ .......................... B23K 26/00; G11B 5/127
(52) U.S. Cl. .................. 264/400; 264/139; 264/482; 219/121.69; 219/121.73; 219/121.82; 29/603.15; 29/603.18
(58) Field of Search ................. 264/400, 139, 264/162, 482; 219/121.68, 121.82, 121.69, 121.73; 29/603.15, 603.18

(56) References Cited

U.S. PATENT DOCUMENTS

| | | | |
|---|---|---|---|
| 4,301,353 A | 11/1981 | Suenaga et al. | 219/121 LJ |
| 4,737,330 A * | 4/1988 | Rau | 264/138 |
| 4,894,740 A | 1/1990 | Chhabra et al. | 360/103 |
| 4,912,883 A | 4/1990 | Chang et al. | 51/165 R |
| 4,914,868 A | 4/1990 | Church et al. | 51/165.71 |
| 5,065,500 A | 11/1991 | Yoneda et al. | 29/603 |
| 5,095,613 A | 3/1992 | Hussinger et al. | 29/603 |
| 5,266,769 A | 11/1993 | Deshpande et al. | 219/121.69 |
| 5,284,477 A | 2/1994 | Hanna et al. | 606/5 |
| 5,442,850 A | 8/1995 | Kerth | 29/603 |
| 5,452,166 A | 9/1995 | Aylwin et al. | 360/126 |
| 5,531,017 A | 7/1996 | Church et al. | 29/603.12 |
| 5,620,356 A | 4/1997 | Lackey et al. | 451/5 |
| 5,650,893 A | 7/1997 | Bolasna et al. | 360/103 |
| 5,675,461 A | 10/1997 | Aylwin et al. | 360/126 |
| 5,687,042 A * | 11/1997 | Chhabra et al. | 360/103 |
| 5,704,112 A | 1/1998 | Katase et al. | 29/603.12 |
| 5,713,123 A | 2/1998 | Toyoda et al. | 29/602.12 |
| 5,722,156 A | 3/1998 | Balfrey et al. | 29/603.08 |
| 5,739,048 A * | 4/1998 | Kerth et al. | 437/226 |
| 5,768,055 A * | 6/1998 | Tian et al. | 360/103 |
| 5,982,583 A * | 11/1999 | Strom | 360/103 |
| 6,073,337 A * | 6/2000 | Strom | 29/603.12 |
| 6,075,604 A * | 6/2000 | Crawforth et al. | 356/371 |

* cited by examiner

Primary Examiner—Stefan Staicovici
(74) Attorney, Agent, or Firm—Robert B. Martin

(57) ABSTRACT

A method for producing sliders having positive camber on the air bearing surface. The method comprises (i) scribing the air bearing surface of a slider row along a line between individual sliders, (ii) flat plate lapping the air bearing surface of the slider row, and (iii) producing a pattern of stress on the back side of the slider row to create positive camber in each individual slider in the slider row.

5 Claims, 4 Drawing Sheets

METHOD FOR MANUFACTURE OF SLIDERS

BACKGROUND OF THE INVENTION

1. Field of the Invention

The present invention relates to an improved method for the manufacture of sliders. More particularly, the invention relates to an improved method for producing a positive camber on the air bearing surface (ABS) of a slider.

2. Description of the Background Art

Digital magnetic recording devices for data storage generally comprise a thin film magnetic recording disk and a head or transducer which is moved along or above the surface of the rotating disk to electromagnetically read and write information on the disk. Advanced thin film magnetic recording disks generally comprise a rigid substrate, a magnetic layer such as a cobalt-based metal alloy, a protective amorphous carbon layer and a lubricant layer, such as a perfluoropolyether disposed on the carbon overcoat.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". A slider generally serves to mechanically support the head and any electrical connections between the head and the rest of the disk drive system. The slider is aerodynamically shaped to glide over moving air and, therefore, to maintain a uniform distance from the surface of the rotating disk, thereby preventing the head from undesirably contacting the disk.

Typically, a slider is formed with an aerodynamic pattern of protrusions on the ABS which enable the slider to fly at a constant height close to the disk during operation of the disk drive.

The recording density of a magnetic disk drive is limited by the distance between a transducer and the magnetic media. One goal of air bearing slider design is to "fly" a slider as closely as possible to a magnetic medium while avoiding physical impact with the medium. Smaller spacings, of "fly heights", are desired so that the transducer can distinguish between the magnetic fields emanating from closely spaced regions on the disk.

It has been found that two important characteristics of the slider necessary to achieve and maintain the desired flying characteristics for the slider are crown and camber. Crown is the deviation from a planar surface in the direction of air flow with a concave shape defined as negative crown and a convex shape defined as positive crown. Camber is the deviation from a planar surface in a direction normal to the direction of air flow. A concave shape is defined as negative camber and a convex shape is defined as positive camber. Neither negative crown nor negative camber of the ABS is desired for sliders since this not only leads to variation in the flying height but also makes it more likely that the edges of the slider will damage the recording medium should there be inadvertent contact with the recording medium.

In manufacturing such read/write heads, a large number of sliders are fabricated from a single wafer having rows of the magnetic transducers deposited simultaneously on the wafer surface using semiconductor-type process methods. In one process embodiment, after deposition of the heads is complete, the wafer is cut into four quadrants. Each quadrant is then bonded to a lapping fixture and grounded on a lapping plate to provide accurate head dimensions. After lapping, single row bars of sliders are cut from the wafer quadrant. These row bars can optionally be lapped again, and the ABS design is etched in each slider using art-known lithographic techniques. Lastly, the row bars are adhered to suitable tape; and each bar is diced, i.e., separated with a diamond-cut saw into individual sliders, each having a magnetic head terminating at the ABS. Each slider is then cleanly removed from the tape, inspected to insure operability of the magnetic head, and attached to an actuator for use in a magnetic disk drive.

Unfortunately, the lapping process produces stresses in the row bars, causing them to bow or bend. This can result in undesirable negative ABS camber in the finished individual sliders. Therefore, there still is a need in the art for a slider manufacturing process which results in heads with positive camber.

It is, therefore, an object of the present invention to provide an improved method for the manufacturing of magnetic heads. Other objects and advantages will become apparent from the following disclosure.

SUMMARY OF THE INVENTION

The present invention relates to a method for producing sliders having positive camber on the ABS. The method comprises (i) scribing the ABS along a line between individual sliders, (ii) lapping the ABS of the slider row on a flat lapping plate, and (iii) producing a pattern of stress relief on the back side of the slider opposite the air bearing surface to create positive camber and crown in each individual slider in the slider row.

A more thorough disclosure of the present invention is presented in the detailed description which follows and the accompanying figures.

DETAILED DESCRIPTION OF THE INVENTION

Figure 1:
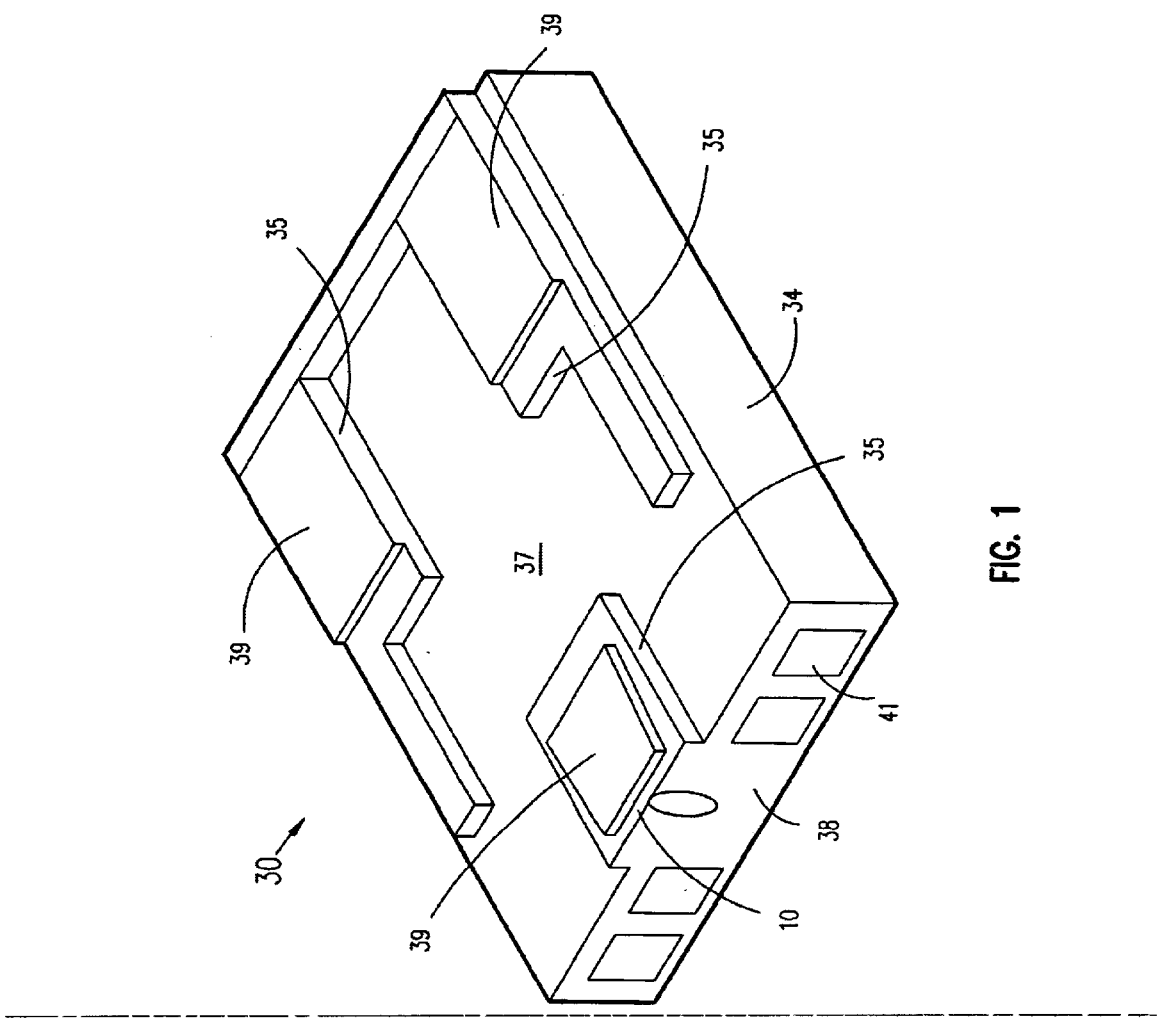
FIG. 1 is a perspective view of a slider.

The present invention relates to an improved method for the manufacture of sliders. Referring to FIG. 1, there is shown a typical thin film head slider 30 with a negative pressure ABS. The slider 30 is generally rectangular in shape. It consists of two portions, i.e., a slider portion 34 and a head portion 38, formed on an end face of the slider portion 34. Typically, this end face of the slider will constitute the slider trailing edge when the slider is suspended above and adjacent a rotating recording disk.

The slider portion 34, which constitutes the bulk of the thin film head slider 30, is made of a ceramic material such as $Al_2O_3$-TiC, or other suitable material (e.g., N58). In one embodiment, the ABS of slider 34 comprises, as shown, three dual depth step-pads 35 having top surface 39 and disposed on a recessed face 37 of the slider 30. Two step-pads are at the leading edge and one is at the trailing edge. The head portion 38 is located on the single step-pad near the trailing edge of the slider 30. The step pads 35 and the recessed face 37 are all important structural features which enable the head portion 38 to glide a short distance above the surface of a magnetic disk. A variety of other ABS designs are known in the art, such as disclosed in U.S. Pat. No. 5,650,893 (for negative pressure design) and U.S. Pat. No. 4,894,740 (for positive pressure design), the disclosures of which are incorporated herein by reference.

The head portion 38 typically is a thin layer of alumina formed on the trailing edge face of the slider portion 34 in which a magnetic head 10 is embedded. Suitably, it is a magnetoresistive read element and inductive head for writing data. Electrical terminal pads 41 provide electrical connection for the magnetic head element.

Figure 2:
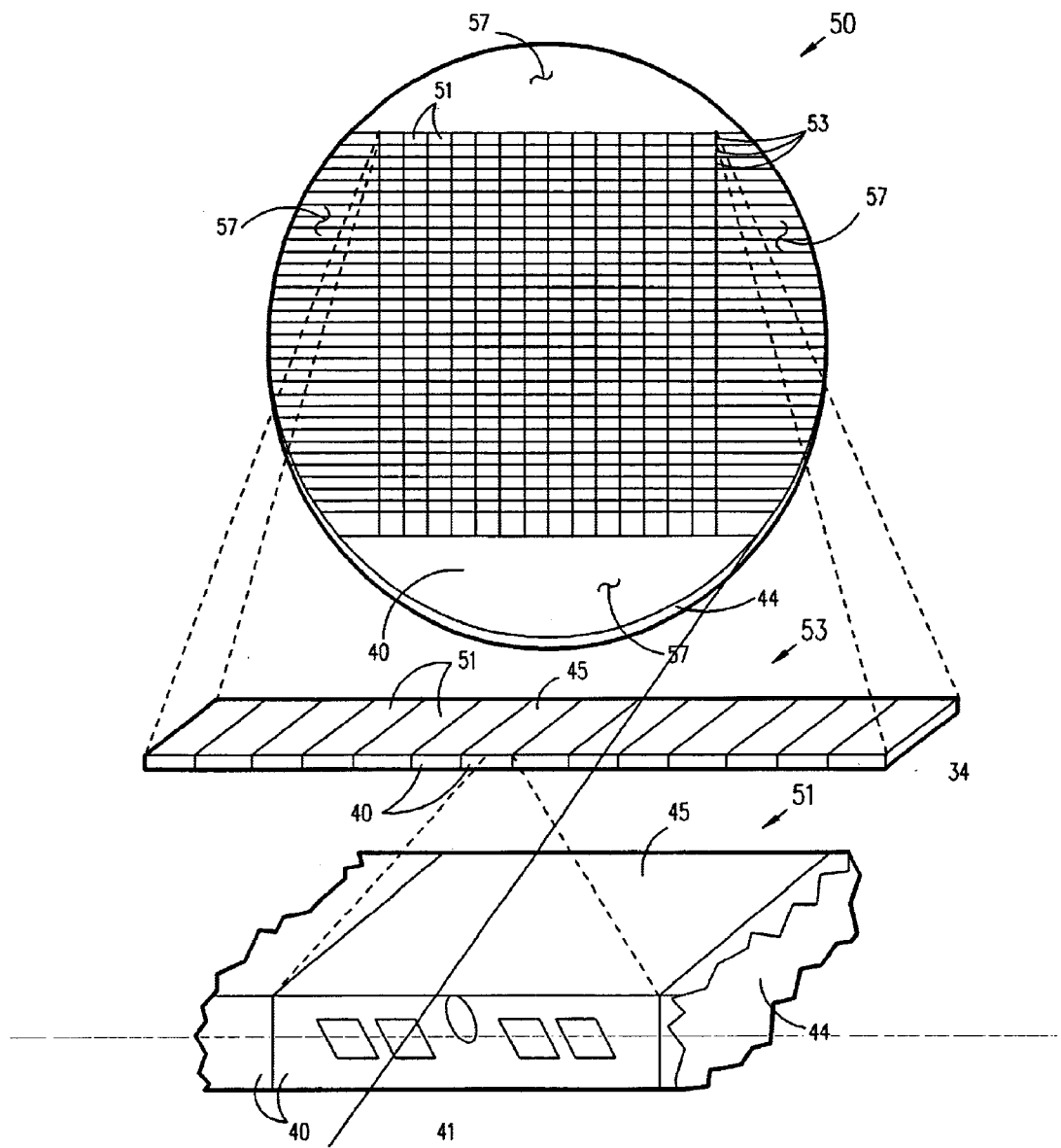
FIG. 2 is a perspective view of a wafer element having a plurality of magnetic heads fabricated thereon in rows and depicting the detailed structure of a row and a slider.

Referring to FIG. 2, the above-described thin film head slider 30 has been fabricated from a preprocessed wafer 50, as shown in FIG. 2, or from a wafer quadrant. The wafer 50 comprises a wafer substrate 44 which is suitably covered by thin layer 40 of alumina. The magnetic head device is formed in the layer 40. The magnetic heads are arranged in rows and are suitably identically oriented. Typically, the thickness of the wafer substrate 44 is equal to the length of the finished slider 30.

The wafer 50 comprises a matrix of slider rows 51 arranged in rows 53 which when fully processed will become sliders 30. The view shown in FIG. 2 is an end view of the individual slider rows 51 with the magnetic heads having been formed on the ends of the slider rows 51. As shown in FIG. 2, a plurality of identical row bars 53, each of which comprises a row of identical slider rows 51, together with superfluous sections, such as top and bottom sections 57 where no slider rows are formed constitute the wafer 50. The wafer may be fabricated to contain any desirable number of rows 53 of slider rows 51 and any desirable number of slider rows 51 in each row, depending on the size of the wafer and the size of the sliders.

The slider row 51 shown in FIG. 2 is identical with the finished slider 30 shown in FIG. 1, except that the ABS is not yet formed and the throat height for the poles and the head elements are greater in the unfinished slider row 51. Since the throat height for the poles and the head elements in each slider row 51 are greater than in a finished slider 30, lapping of the top of face 45 of each slider row 30 in a controlled manner is accomplished to obtain a slider 30 with the desired throat and element heights. The wafer is preferably cut into four quadrants and each quadrant is lapped to obtain the desired throat and element heights. The desired throat heights and head element heights are achieved by the provision of lapping guides. The lapping guides are then used as indicators of element height during the lapping process for the slider rows 51. The final height of the element may be determined by measuring the resistance of the element itself. See, for example, U.S. Pat. Nos. 4,914,868 and 4,912,883, the disclosure of which are incorporated herein by reference for all purposes.

When fabrication of the magnetic heads on the sliders is complete at the quadrant level, the quadrant is sliced into rows of the slider. In an alternative embodiment, the wafer can be first sliced into rows, and then the individual rows can be lapped.

Figure 3:
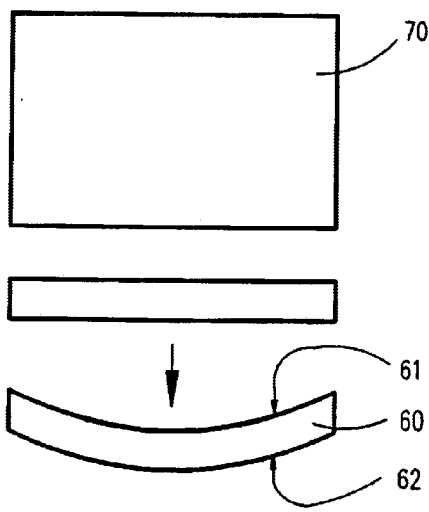
FIG. 3 is a view of slider rows being sliced from a wafer quadrant.
Figure 4:
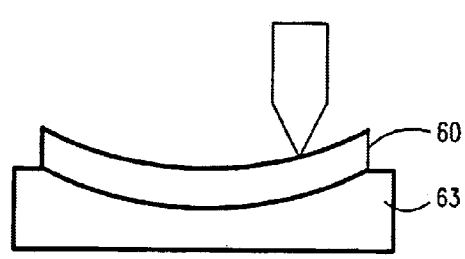
FIG. 4 is an end view of a bowed slider row being scribed.

Referring to FIG. 3, after the row of sliders 60 is cut from the wafer quadrant 70, it bows due to the stress built up during the lapping process. The bowed row of sliders 60 has a concave curvature on its ABS side 61, which will result in negative camber for the individual sliders in row 60. The back side 62 of the row of sliders has a convex curvature. Referring to FIG. 4, the back side 62 of row 60 is then bonded to an adhesive tape 63, and scribe lines are formed between individual sliders suitably with a scribe or laser. The scribe lines are preferably formed with a diamond scribe. To form the lines, the diamond scribe is positioned on the ABS side 61 of row 60 and moved along the row with a bias load, e.g., about 100 grams to form the line. The residual stress from the scribe lines generates the directional bending of the row perpendicular to the scribe lines.

Figure 5:
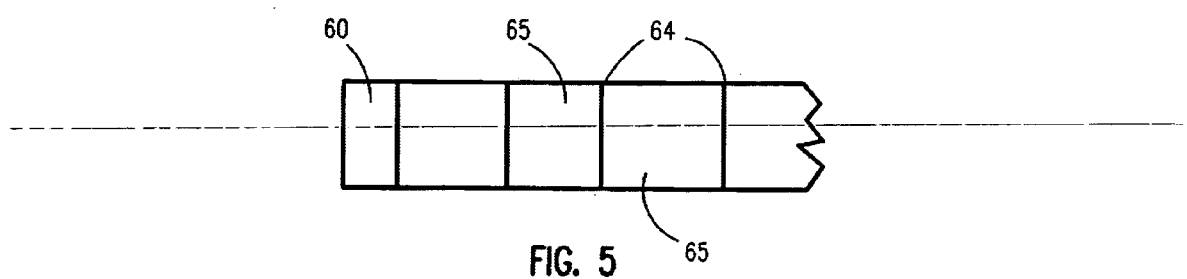
FIG. 5 is a top view of a slider row with scribe lines.
Figure 6:
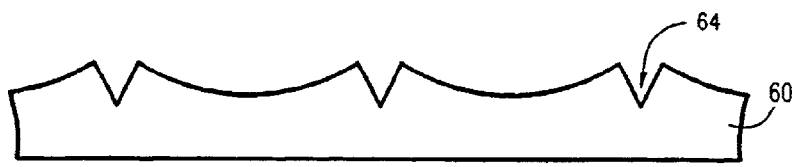
FIG. 6 is an enlarged view of a scribed slider row.
Figure 7:
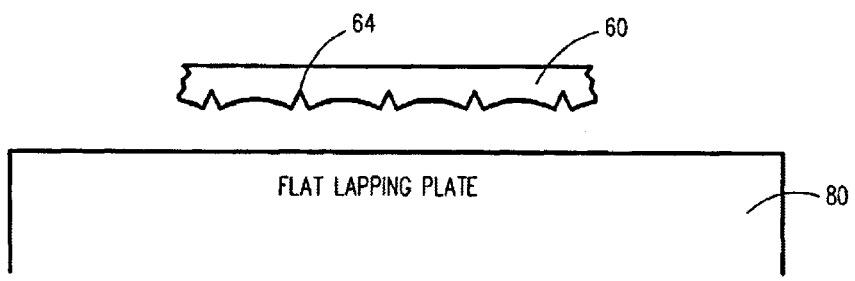
FIG. 7 is a view of lapping scribed slider rows with a flat lapping plate.
Figure 8:
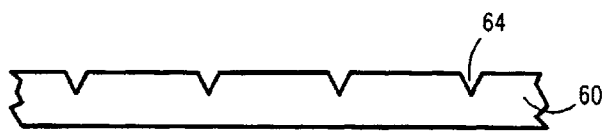
FIG. 8 is an enlarged end view of a scribed slider row after lapping.

Referring to FIG. 5, the lines 64 are placed at the part-off kerfs between individual sliders 65 in row 60. The lines 64 suitably may extend along the entire length between individual sliders. FIG. 6 is a side view of the slider row 60 with scribe lines 64 formed therein. The bow of row 60 has been corrected by the residual stress from scribe lines 64. The slider row 60 is then subjected to one or more art-known lapping processes (i) to level the local protrusions formed by the scribing process, (ii) to define the surface finish of the ABS, and (iii) to obtain a proper throat height and element heights for the head elements. Referring to FIG. 7, the ABS side 61 of the slider row 60 is lapped on a flat lapping plate 80. Suitable lapping conditions utilize a flat tin plate and ⅜ micron diamond slurry. Referring to FIG. 8, after the flat plate lapping process, the ABS side of slider row 60 is generally flat.

After lapping, each row is debonded from the tape and bonded to a carrier for further processing of the slider to form the ABS pattern. The ABS pattern is etched in each slider using art known as lithographic techniques.

The step of producing a chosen ABS pattern on the slider can be carried out by etching, ion milling or other machining technique, or by laser ablation such as described in U.S. Pat. 4,301,353.

Figure 9:
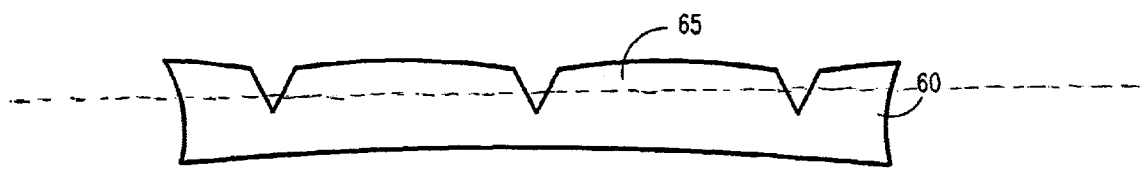
FIG. 9 is an enlarged view of a scribed slider row after laser crown adjustment.

The final process step involves producing a pattern of stress on the backside of the sliders preferably in accordance with the teaching of U.S. Pat. 5,266,769, which is incorporated herein by reference. Suitably, a laser beam is focused on the back side of each slider and a chosen pattern of stress is formed in the slider. Referring to FIG. 9, the resulting slider row 60 has convex curvature resulting in a positive camber for the individual sliders in the row.

The row of sliders is then suitably debonded from the carrier and bonded to an adhesive tape for the dicing process where vertical cuts are made in the row generally along the scribe lines to separate each individual slider.

The process of the present invention results in sliders which have positive camber and a positive crown.

The process of the present invention results in sliders which have a positive crown and camber. The present invention enables crown/camber adjustment at the slider row level, thereby avoiding problems associated with conventional crown/camber adjustment techniques at the slider level. The present invention enables flat plate lapping of the ABS side of the sliders to avoid the problems associated with generating crown with curved plate lapping. Lastly, the present invention avoids disturbing the ABS side of the slider after the ABS pattern has been formed, thereby enabling ABS designs with shallow etch depths.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

We claim:

1. A method for producing positive camber on the air bearing surface of a slider comprising:
   (a) scribing lines on the air bearing surface side of a slider row between individual sliders in the slider row;
   (b) flat plate lapping the air bearing surface side of the slider row; and
   (c) producing a pattern of stress on the side of the slider row opposite the air bearing surface side.

2. The process of claim 1, wherein the lines are scribed using a diamond scribe.

3. The process of claim 1, wherein an air bearing pattern is formed in the air bearing surface of each slider in the slider row after flat plate lapping of the slider row.

4. The process of claim 1, wherein the pattern of stress is formed in the slider row with a laser beam.

5. The process of claim 3, wherein the air bearing pattern is formed by laser ablation.

* * * * *